May 12, 1936.  W. P. KELLETT  2,040,486
SHOCK REDUCING CAR STRUCTURE
Filed March 29, 1935   3 Sheets-Sheet 1
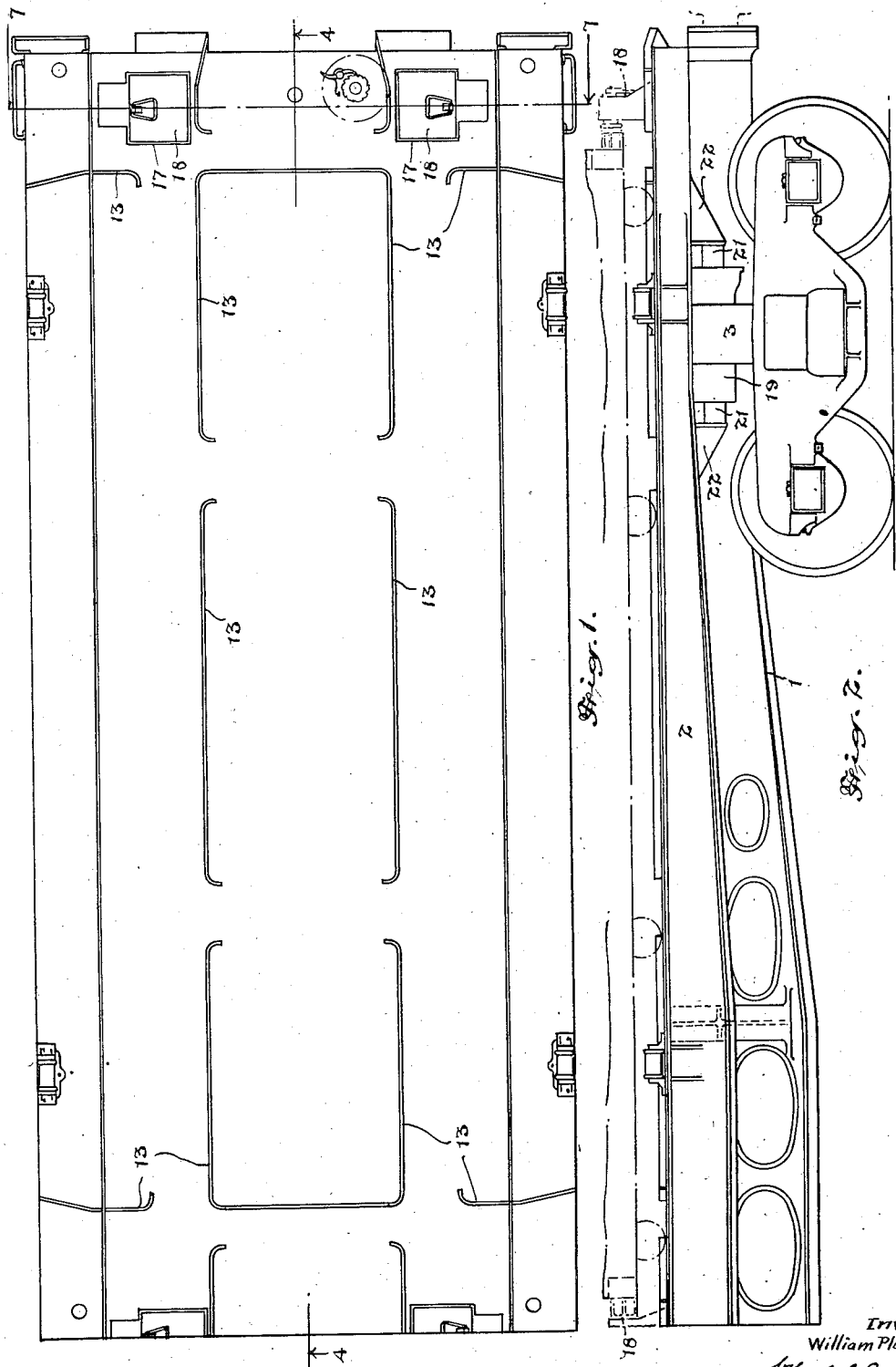
Inventor
William Platts Kellett.

May 12, 1936.  W. P. KELLETT  2,040,486
SHOCK REDUCING CAR STRUCTURE
Filed March 29, 1935   3 Sheets-Sheet 2
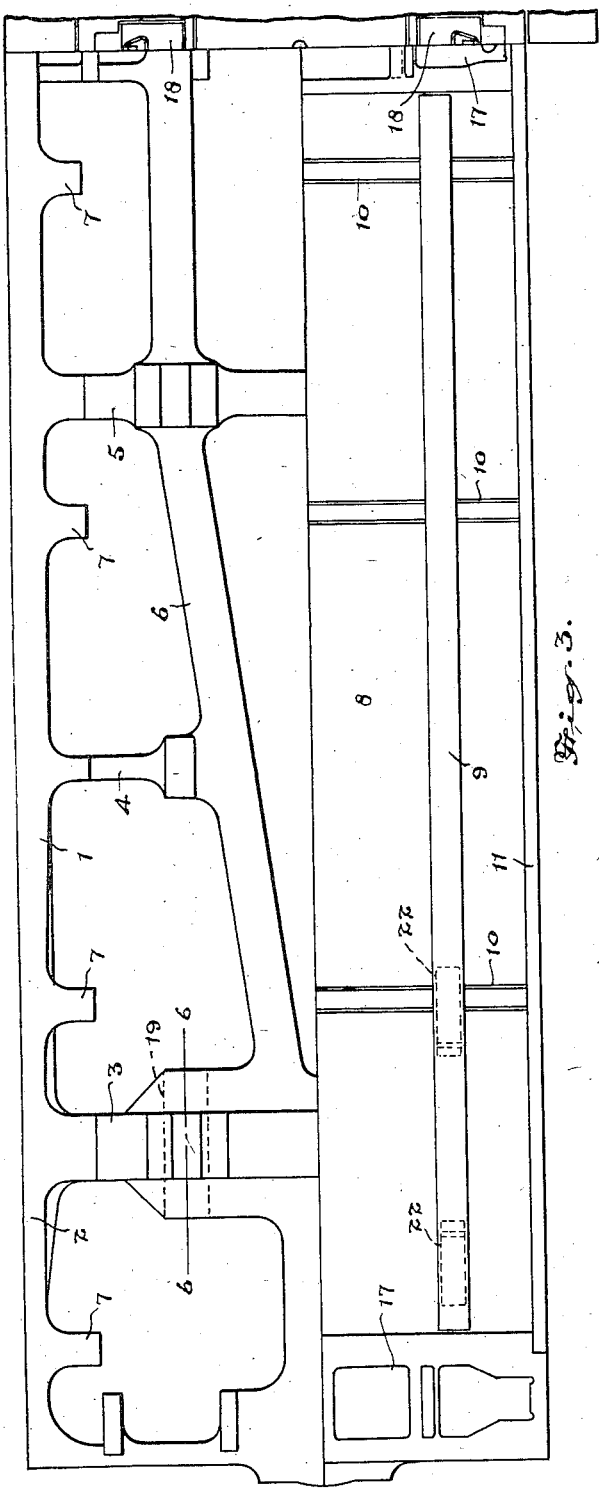
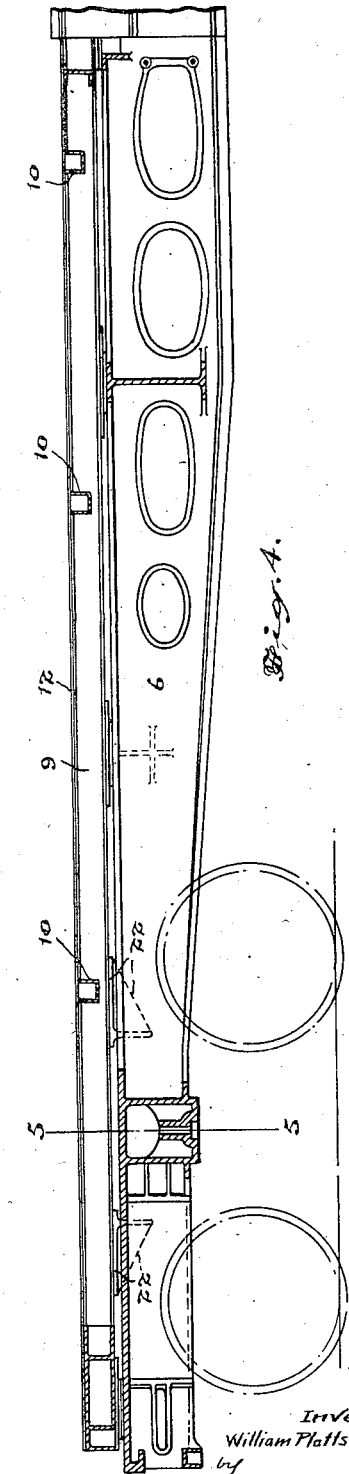

May 12, 1936. W. P. KELLETT 2,040,486
SHOCK REDUCING CAR STRUCTURE
Filed March 29, 1935 3 Sheets—Sheet 3

Inventor:
William Platts Kellett.
by
H. J. S. Dennison
atty.

Patented May 12, 1936

2,040,486

UNITED STATES PATENT OFFICE 2,040,486

SHOCK REDUCING CAR STRUCTURE

William Platts Kellett, New York, N. Y.

Application March 29, 1935, Serial No. 13,615

7 Claims. (Cl. 105—392.5)

The principal objects of this invention are to provide a structure particularly adaptable to railway cars and especially to cars adapted to carry removable goods containers, which will materially lessen the damage resulting from impact shocks to the car, the container and the goods being transported, and to accomplish this desired result in an economical structure which will require no servicing beyond that which is required in ordinary rolling stock and in which the load supporting part movable upon the car frame will be of the least possible dead weight.

Under existing railroad operating conditions it is the common practice in making up trains to couple the cars by impact and switching operations have been so severely increased due to increase in coupling speed that losses through breakage of goods and damage to cars are extremely heavy. Numerous attempts have been made to overcome this condition and the use of heavy compression springs both in the draft gear and between the car frame and body have been developed to a considerable extent, but there are many conditions entailed with such constructions that require elimination from the standpoint of initial and maintenance cost as well as successful operation in service.

The principal feature of this invention consists in the novel construction of the car frame and of a platform of relatively narrow width supported upon contact areas on the frame sufficient to support the maximum load carried by the platform and permitting relative longitudinal sliding movement between the platform and car frame under impact shocks, spring means being provided between said platform and car frame to limit the longitudinal movement of the platform and to maintain the platform in a defined position under normal operating conditions.

A further and important feature is to devise a structure which can be economically manufactured and which will maintain an operable alignment of relatively movable supports under the stresses of use.

In the accompanying drawings, Figure 1 is a plan view of a portion of the deck of a railway car constructed in accordance with this invention.

Figure 2 is a side elevational view of a portion of the car illustrated in Figure 1.

Figure 3 is a plan view of the length of car shown in Figure 1, one half thereof showing the under structure of the deck with the deck surface removed, and the other half showing the car frame which underlies the deck.

Figure 4 is a longitudinal sectional elevation on the line 4—4 of Figure 1.

Figure 5:
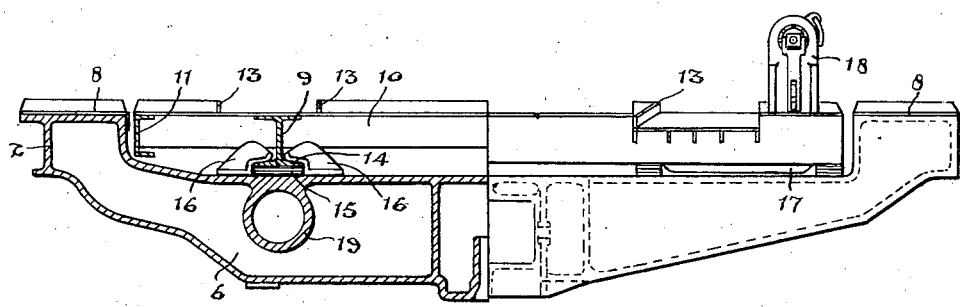
Figure 5 is an elevational end view and part vertical section through the bolster structure and the frame on the line 5—5 of Figure 4.
Figure 7:
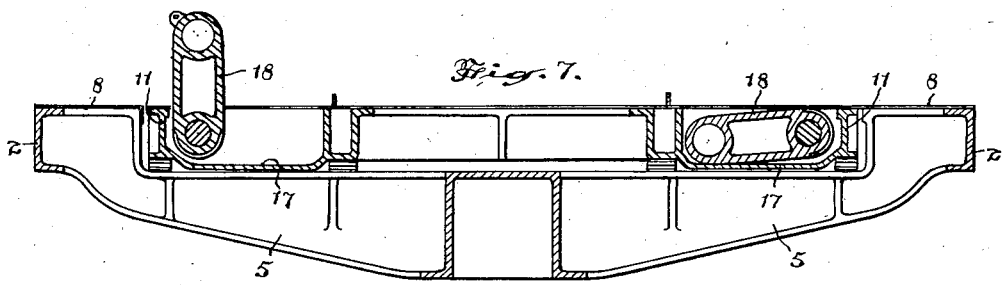
Figure 7 is a transverse vertical section through the car deck and frame on the line 7—7 of Figure 1.
Figure 6:
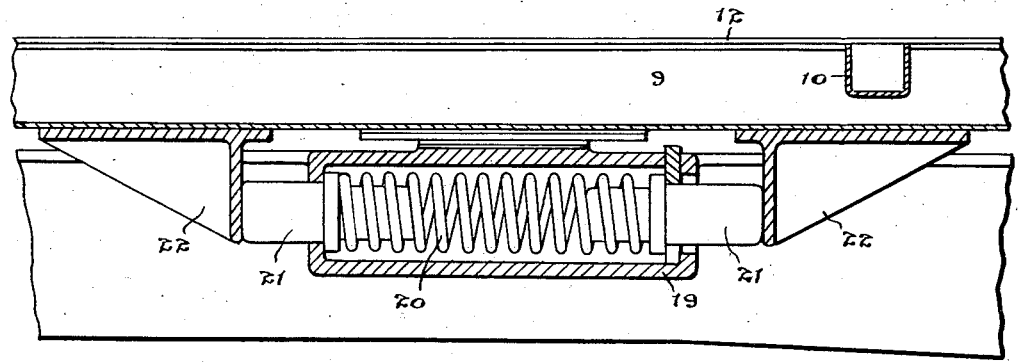
Figure 6 is an enlarged longitudinal vertical section taken through the deck and bolster at the line 6—6 of Figure 3.

In the car structure herein shown the frame 1 is formed of a unitary steel casting, the side members 2 being connected at intervals by the bolster structure 3 and cross webs 4 and 5 with the longitudinal truss beam members 6.

The side members 2 are raised above the truss beam members 6 and are of a box-like formation and form a longitudinal central well extending from end to end to receive the load-carrying deck structure which is of sufficient width to support the goods containers which are to be placed thereon.

A plurality of flanged web members 7 project inwardly from the inner side of the side members 2 and a flanged deck plate 8 covers the top of same from end to end of the frame.

A moveable platform or deck structure is arranged within the well of the frame 1 and is formed of a pair of longitudinal beams 9 which extend from end to end of the car, and a plurality of cross members 10 are rigidly secured to these longitudinal beams and extend between and beyond same, said cross members being formed of light gauge U-shaped metal bars as shown particularly in Figure 4. At the outer end of the cross members 10 are secured the longitudinal side bars 11. All of these members are welded together and to the deck plate 12, thus forming a very rigid, unitary platform structure.

The top surface of the deck plate has arranged thereon a plurality of upstanding flanges 13 which form guideways for the castor roller supports of movable goods containers which it is the prime intent of this invention to accommodate. These guideways are arranged preferably directly over the longitudinal beams 9 of the platform. The longitudinal beams 9 form the mains supporting structure of the platform and these beams are provided with friction plates 14 of suitable materials arranged at intervals on the under flange to align with the bolster and cross webs of the frame 1 and corresponding plates 15 are mounted on or form a part of the frame in alignment therewith.

Holding brackets 16 are rigidly secured to the bolster and cross members of the frame and overlap the lower flanges of the longitudinal beams 9 to hold the platform from lateral movement, but allowing free longitudinal movement.

At the ends and in the centre of the platform structure and arranged toward the outward sides are rigidly secured the hollow castings 17 in which are mounted the pivotal jacks 18 which are adapted to hold the movable containers rigidly in position on the platform, said hollow castings being constructed to house the jacks when in their lowered position clear of the platform deck.

The bolster 3 has formed therein in vertical alignment with the centre line of each of the longitudinal beams 9 of the platform structure, a horizontal cylinder 19 within which there is arranged a compression spring 20, and at each end of said spring is mounted a plunger 21 projecting from the end of the cylinder and bearing against the end of the spring.

Brackets 22 are rigidly secured to the underside of the longitudinal beams 9 of the platform and extend downwardly to engage the outer ends of the plungers 21. The spring 20 holds both plungers in close engaging contact with the brackets 22 during the normal operation of the car, there being two sets of such plungers and spring structures on each bolster, but in the event of a car being subjected to extraordinary impact shocks the platform will move longitudinally upon the engaging rubbing plates 14—15 against the compression of the springs, which movement may occur from either end.

Normal impact shocks will not disturb the position of the platform upon the car frame, but when abnormal shocks occur the frictional resistance of the platform proportional to the load thereon will ultimately yield and allow the frame of the car to move longitudinally relative to the platform and its load. When the least displacement occurs the springs 20 come into operation to offer an increasing resistance to such movement, and the movement is ultimately arrested. The energy expended in the impact is stored in the springs, and upon the cessation of the impact this energy is exerted to restore the platform to its normal relative position on the frame.

It will be understood that with a structure such as described, goods containers mounted on the platform and the goods therein will be relieved of the destructive effect of abnormal impact shocks with the resultant saving in damage to property and also damage to the rolling stock as the impetus of the loads will be absorbed in the springs.

The use of springs as impact absorbing agents is of course very old, but it will be understood that a structure wherein the load is supported above a multiplicity of small areas through the length of the car, will be highly desirable.

The simplicity of construction, particularly where the frame is of a one-piece casting such as described, permits the surfaces for supporting the friction plates to be accurately aligned at a minimum of expense and no other machining will be necessary.

The forming of the longitudinal well within the frame is a very important feature in order to provide a car platform of standard width while limiting the moving platform to the lightest possible weight for the strength required.

This invention is herein shown as applied particularly to the railway type of car, but it will be understood that it can be applied to trucks or other forms of vehicles and its use with separate goods containers is extremely desirable in order to avoid damage to the container structures.

What I claim as my invention is:—

1. A car having a flat sectional deck the respective sections of which are disposed in transverse succession across the deck and relatively displaceable in opposition to frictional braking resistance under shock influence.

2. A car having a flat deck divided in the transverse direction into separate relatively displaceable deck sections extending longitudinally of the car, one of said deck sections being adapted to receive and support the load, and means for restricting relative longitudinal shock displacement of said deck sections.

3. A car having a flat deck formed of longitudinally extending relatively displaceable sections disposed side-by-side in a substantially horizontal plane, one of said sections being adapted to receive and support the load for shock-relief displacement relative to the other deck section, means for frictionally resisting the relative displacement of said respective deck sections from a normal relation, and means for constantly urging said relatively displaceable deck sections into normal relation.

4. A car comprising a frame having side portions raised above the main area and extending longitudinallly from end to end and also having a plurality of support areas arranged between said raised sides, a platform arranged in the well formed between the raised sides of said frame to frictionally engage said support areas and having its top substantially level with the top of the raised sides of said frame, and spring means for holding said platform in an operating position on said frame.

5. A car comprising a frame having a depressed well formation extending longitudinally leaving raised side deck portions, frictional contact surfaces disposed within the well formation, longitudinally displaceable platform means accommodated in said well formation for frictional contact with the frictional contact surfaces thereof to restrict longitudinal displacement of the platform means in the well formation, said platform means having the upper surface substantially flush with the upper surface of the raised side deck portions and adapted to directly receive and support the entire load, and means co-operatively interposed between said recessed platform means and the car frame for applying a positioning influence to said platform means.

6. A car having a unitary rigid cast frame formed with longitudinal truss sections and transverse supports, said transverse supports having a series of horizontal areas arranged throughout its length at either side of the longitudinal centre, all of said areas being machine-surfaced to present contact surfaces in a common horizontal plane, a platform structure having contact areas to coincide with and frictionally engage the machined areas on said frame, compression springs housed in said frame, and brackets on said platform held by said springs, the machine surfacing of the contact surfaces of the rigid cast frame ensuring uniform pressure distribution and frictional contact between the respective complements of contact surfaces.

7. A flat deck car comprising a frame having flat side deck areas extending above a central well, a platform for supporting movable containers and of a minimum width to carry said containers mounted for longitudinal movement in said well, said platform comprising a central flat deck section presenting an upper surface in substantial horizontal flush continuation of the upper surface of the flat side deck areas, friction supports for said platform, and spring means for resisting endwise movement of said platform.

WILLIAM PLATTS KELLETT.